United States Patent [19]

Yamaguchi

[11] Patent Number: 4,606,015
[45] Date of Patent: Aug. 12, 1986

[54] METHOD AND APPARATUS FOR DETECTING POSITION OF OBJECT WITH ULTRASONIC WAVE

[75] Inventor: Kenichi Yamaguchi, Katsuta, Japan
[73] Assignee: Hitachi, Ltd., Tokyo, Japan
[21] Appl. No.: 525,403
[22] Filed: Aug. 22, 1983

[30] Foreign Application Priority Data

Aug. 27, 1982 [JP] Japan .............................. 57-147539

[51] Int. Cl.$^4$ ............................................. G01S 15/12
[52] U.S. Cl. ........................................ 367/95; 367/99;
367/107; 367/908
[58] Field of Search ............. 367/95, 908, 99, 107–115

[56] References Cited

U.S. PATENT DOCUMENTS

| | | | |
|---|---|---|---|
| 3,184,969 | 5/1965 | Bolton | 367/908 X |
| 3,787,802 | 1/1974 | Brahman | 367/95 |
| 3,985,030 | 10/1976 | Charlton | 367/95 X |
| 4,000,650 | 1/1977 | Snyder | 367/95 X |

*Primary Examiner*—Richard A. Farley
*Attorney, Agent, or Firm*—Antonelli, Terry & Wands

[57] ABSTRACT

An apparatus for detecting the position of an object with an ultrasonic wave includes a timing control circuit generating first and second timing signal trains, the interval of the first timing signal trains being set to be shorter than that of the second; an ultrasonic wave pulse generator circuit generating first and second ultrasonic wave pulses in synchronism with the first and second timing signal trains, the first ultrasonic wave pulses covering a short distance range to the object and the second ultrasonic wave pulses covering a long distance range to the object, the width of the first ultrasonic wave pulse being set to be shorter than that of the second. An ultrasonic wave pulse transmitter transmits alternately the first and second ultrasonic wave pulses; a receiver receives the reflected first and second ultrasonic wave pulses from the object; and a discriminator circuit discriminates the reflected first and second ultrasonic wave pulses from the receiver. A position decision determines the position of the object in accordance with a time interval between the transmission and reception of the discriminated first and second ultrasonic wave pulses; and a signal timing change-over circuit changes over the generation of the first and second timing signal trains from the timing control circuit to only the first timing signal train when the position of the object is determined to be in the short distance range by the position decision circuit.

7 Claims, 2 Drawing Figures

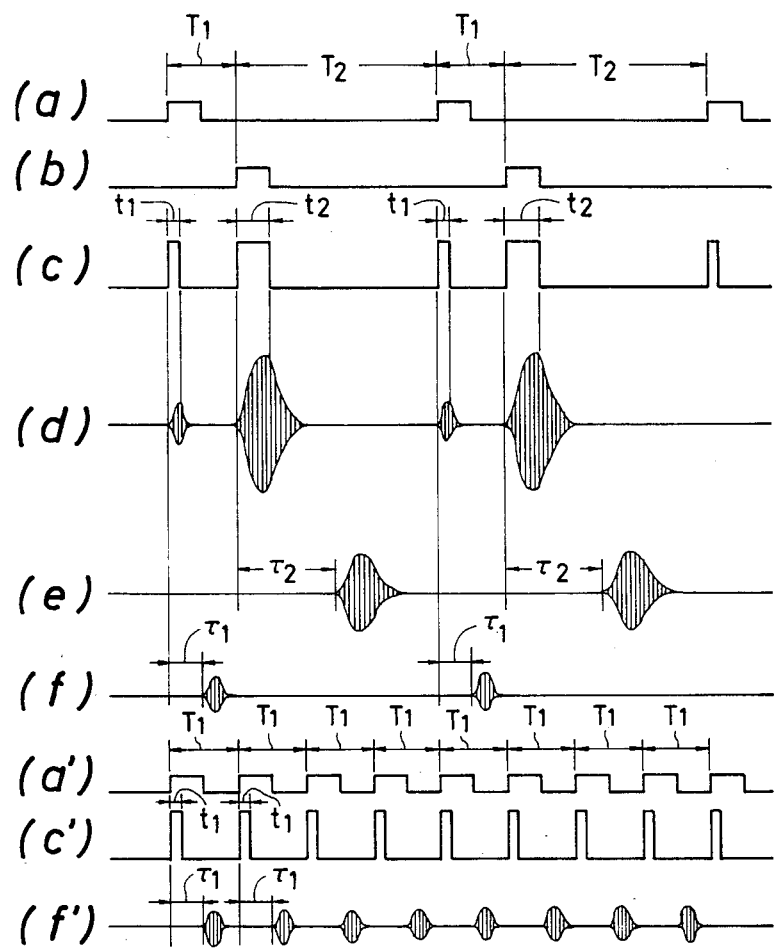

METHOD AND APPARATUS FOR DETECTING POSITION OF OBJECT WITH ULTRASONIC WAVE

BACKGROUND OF THE INVENTION

The present invention relates to a method and apparatus for detecting the position of an object with an ultrasonic wave. More particularly, it relates to a method and apparatus of the type described which are well-suited for sensing the position of an obstacle that lies in a dead angle area around an automobile as viewed from the driver.

The detection of the position of an object has been performed by transmitting an ultrasonic wave into the air in the shape of pulses and measuring the period of time taken until the ultrasonic wave reflected by the object returns to a receiver. Part of the transmitted ultrasonic wave is received by the receiver directly without being reflected by the object. Such received wave, namely, a side-lobe wave is independent of the position of the object. Therefore, only the reflected wave is usually specified in such a way that a false signal simulative of the side-lobe wave is separately generated and that a component corresponding to the side-lobe wave is removed from the received wave by comparison. Such position-sensing apparatus is disclosed in Japanese Laid-open Patent Application No. 51-105851.

The prior-art position-sensing apparatus stated above has the problem that, if an object exists at a very close distance, the reflected wave is received in superposition on the side-lobe wave, so the position of the object cannot be accurately detected in consequence of the removal of the side-lobe wave. That is, an error is involved in the detection of the object within a distance corresponding to a time width in which the side-lobe wave affects the reception waveform. To the end of enhancing the detection accuracy of an object at a close distance, it is considered to merely shorten the transmission time (pulse width) of an ultrasonic wave to be transmitted, thereby to reduce the time width in which a side-lobe wave is detected. Since, however, an ultrasonic wave transmitter requires a certain period of time before the sound pressure of an acoustic wave reaches a necessary pressure level, the transmission pulse width cannot be shortened beyond a certain limit. Moreover, in the case the pulse width is set to be smaller than a certain value, a sufficient sound pressure cannot be attained, and the detection of an object at a far distance becomes impossible. Therefore, such measure is not practicable.

SUMMARY OF THE INVENTION

An object of the present invention is to provide a method and apparatus for detecting the position of an object with an ultrasonic wave, which accurately detects an object at a very close distance and which can also detect an object at a far distance.

Another object of the present invention is to provide a method and apparatus for detecting the position of an object with an ultrasonic wave, which has an excellent responsiveness and a high detecting accuracy in a very close distance range.

The present invention consists in transmitting the two kinds of ultrasonic wave pulses including an ultrasonic wave pulse which has a time width large enough to attain the maximum sound pressure of a transmitter and an ultrasonic wave pulse which has a low sound pressure but has a small time width, thereby making it possible to detect an object at a far distance with the ultrasonic wave pulse of the large time width and an object at a very close distance with the ultrasonic wave pulse of the small time width.

Further, the present invention consists in that usually the ultrasonic wave pulse of the large time width and the ultrasonic wave pulse of the small time width are alternately transmitted, and that once an object has been detected at a very close distance, only the ultrasonic wave pulse of the small time width is transmitted, besides a transmission interval being shortened, whereby the responsiveness and detection accuracy at the very close distance are enhanced.

BRIEF DESCRIPTION OF THE DRAWINGS

FIG. 2 is a waveform diagram for explaining the operations of the apparatus in FIG. 1.

DETAILED DESCRIPTION OF THE INVENTION

Figure 1:
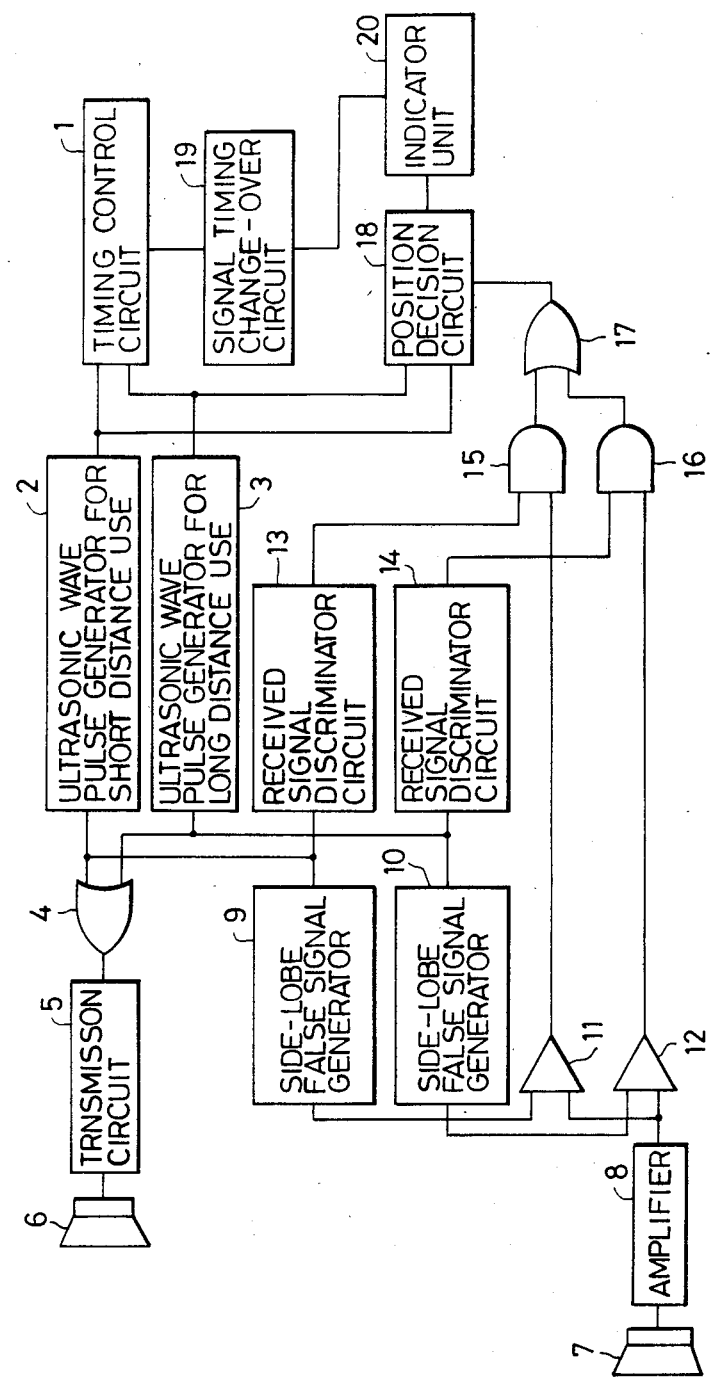
FIG. 1 is a block diagram which shows an apparatus according to the present invention for detecting the position of an object with an ultrasonic wave.

In an embodiment shown in FIG. 1, a timing control circuit 1 generates timing signals for transmitting ultrasonic waves as shown in FIG. 2, (a) and (b). The timing signal shown at (a) in FIG. 2 is applied to an ultrasonic wave pulse generator circuit 2 for close distance use to be described later, and the signal shown at (b) is applied to an ultrasonic wave pulse generator circuit 3 for far distance use, thereby to control the timings of the generation of the ultrasonic waves. The period of time which is taken until a reflected wave is received after the ultrasonic wave has been transmitted, is proportional to a distance to an object. Therefore, the signal intervals $T_1$ and $T_2$ of the respective timing signals (a) and (b) are determined in accordance with a required measurement range, namely, a wait time for receiving the refected wave. In an example of the present invention, $T_1=24$ msec was set of measuring a range of 0–1 m, and $T_2=72$ msec for measuring a range of 1–3 m. The ultrasonic wave pulse generator circuit 2 for close distance use generates transmission pulses of short duration $t_1$ in response to the timing signal (a), while the ultrasonic wave pulse generator circuit 2 for far distance use generates transmission pulses of long duration $t_2$ in response to the timing signal (b). In the example, $t_1=0.2$ msec and $t_2=2.5$ msec were set. The transmission pulses generated by both the ultrasonic pulse generator circuits 2 and 3 are combined through an OR gate 4, to become a signal which is shown at (c) in FIG. 2 and which is applied to a transmission circuit 5. The transmission circuit 5 drives an ultrasonic wave transmitter 6 only when the input signal (c) has a high level. The waveform of the ultrasonic wave which is produced from the transmitter 6 becomes as illustrated in FIG. 2, (d). The ultrasonic wave transmitter to be used may be an ordinary one commercially available, for example, one utilizing the resonance phenomenon of a piezoelectric transducer. In the embodiment, the transmitter transmits the ultrasonic wave at 40 kHz.

Part of the ultrasonic wave transmitted into the air is reflected by the object and is received by a receiver 7. When amplified by an amplifier 8, the received signals have waveforms as shown at (e) and (f) in FIG. 2. The signal (e) corresponds to the reflected wave of the ultrasonic wave pulse for the long distance use, while the signal (f) corresponds to the reflected wave of the ultrasonic pulse for the short distance use. Although not shown in the drawing, the side-lobe wave stated before is contained in the received signal in addition to the reflected wave. Side-lobe false signal generator circuits 9 and 10 produce side-lobe false signals in synchronism with the signals of the ultrasonic wave generator circuit 2 for close distance use and the ultrasonic wave generator circuit 3 for far distance use, respectively. The received signals and the side-lobe false signals are respectively applied to the noninverting input terminals and inverting input terminals of comparators 11 and 12. Accordingly, the output of the comparator 11 or 12 becomes a signal which is free from the side-lobe wave of the ultrasonic wave for the close distance use or the side-lobe wave of the ultrasonic wave for the long distance use. Received signal discriminator circuits 13 and 14 generate mask signals of pulse widths $T_1$ and $T_2$, respectively, in synchronism with the signals of the ultrasonic wave generator circuits 2 and 3 similarly to the foregoing. AND gates 15 and 16 are supplied with the mask signals and the received signals. The AND gate 15 passes the short-distance received signal during the period of time $T_1$, while the AND gate 16 passes the long-distance received signal during the period of time $T_2$. Thus, the short-distance received signal and the long-distance received signal are definitely discriminated, and they are applied to a position decision circuit 18 through an OR circuit 17. The position decision circuit 18 is also supplied with the timing signals (a) and (b) generated by the timing control circuit 1, and it calculates the position of the object on the basis of periods of time $\tau_1$ and $\tau_2$ taken till the reception of the reflected waves from the object since the transmission of the transmission pulses. The calculated position of the object is indicated by an indicator unit 20. Owing to the above construction, the very close distance is detected by the transmission wave of small pulse width, and the far distance by the transmission wave of large pulse width. Therefore, an object detection apparatus can be realized which accurately detects the position of the object at the very close distance and which can also detect the object at the far distance, and the detection accuracy can be enhanced by one pair of transmitter and receiver without sacrificing the detectable distance.

Furthermore, the present invention comprises a signal timing change-over circuit 19 which alters the aspect of the timing signal generation of the timing control circuit 1. More specifically, once the position decision circuit 18 has detected an object at a close distance, i.e., within 0-1 m in the embodiment, the timings of the signal generation of the timing signal control circuit are thenceforth changed from the cycles of the time intervals $T_1$ and $T_2$ over to the cycles of only the time interval $T_1$. (a') in FIG. 2 shows the waveform of the signal produced from the timing control circuit 1 after the change-over. Under this state, the ultrasonic wave pulse generator circuit 3 for far distance use does not operate, and only the ultrasonic wave pulse generator circuit 2 for close distance use operates to generate the ultrasonic wave signal of the pulse width $t_1$ at the cycles $T_1$. This state continues until the position decision circuit 18 comes to detect no object within the close distance, namely, within 0-1 m. After no object has come to be detected, the aspect of the timing signal generation of the timing control circuit 1 is changed-over by the signal timing change-over circuit 19 again, and the timing signals are generated at the cycles $T_1$ and $T_2$.

Owing to the above construction, not only the object positions at both the very close distance and the far distance can be accurately detected, but also the detection response accuracy of the object at the close distance can be sharply enhanced.

I claim:

1. A method for detecting the position of an object with an ultrasonic wave comprising the steps of:
   transmitting alternately the pulses of at least first and second different kinds of ultrasonic wave pulses corresponding to different distance ranges to the object, including setting the pulse widths and the transmission intervals between the respective first and second kinds of ultrasonic wave pulses in accordance with the corresponding different distance ranges to the object;
   receiving reflected ultrasonic wave pulses from the object in response to the transmitted ultrasonic wave pulses;
   discriminating the received ultrasonic wave pulses; and
   determining the position of the object depending on the time period from the transmission and reception of the discriminated ultrasonic wave pulses.

2. A method for detecting the position of an object with an ultrasonic wave as defined in claim 1, further comprises a step of changing over to the exclusive transmission of one of the first and second kinds of ultrasonic wave pulses corresponding to the distance to the object determined on the basis of the time period from the transmission and reception of the discriminated ultrasonic wave pulses.

3. A method for detecting the position of an object with an ultrasonic wave as defined in claims 1 or 2 wherein the first and second kinds of ultrasonic wave pulses cover a short distance range and a long distance range to the object, respectively.

4. An apparatus for detecting the position of an object with an ultrasonic wave comprising:
   timing control means for generating a plurality of kinds of timing signals corresponding to a plurality of distance ranges to the object, the time intervals of the plurality of kinds of timing signals being respectively set in accordance with the corresponding plurality of distance ranges to the object;
   ultrasonic wave pulse generator means for generating a plurality of different kinds of ultrasonic wave pulses in synchronism with the plurality of different kinds of timing signals from said timing control means, the widths of said plurality of kinds of ultrasonic wave pulses also being set in accordance with the corresponding plurality of distance ranges;
   ultrasonic wave pulse transmitter means for transmitting alternately the pulses of the plurality of kinds of ultrasonic wave pulses from the ultrasonic wave pulse generator means;
   receiver means for receiving a plurality of kinds of side-lobe signals corresponding to the ultrasonic wave pulses and reflected ultrasonic wave pulses from the object due to the pulses transmitted from said ultrasonic wave pulse transmitter means;
   side-lobe signal eliminator means for generating a plurality of kinds of side-lobe false signals in synchronism with the plurality of kinds of ultrasonic wave pulses from said ultrasonic wave pulse generator means and for eliminating the plurality of kinds of side lobe signals in the received ultrasonic wave pulses from said receiver means;

received signal discriminator means for discriminating the received plurality of kinds of ultrasonic wave pulses from said receiver means; and position decision means for determining the position of the object in accordance with signals from said received signal discriminator means.

5. An apparatus for detecting the position of an object with an ultrasonic wave as defined in claim 4, further comprising signal timing change-over means for changing over the generation of the plurality of kinds of the timing signals from said timing control circuit in response to the determination of the position of the object to timing signals corresponding to distance ranges to the object not greater than the position of the object determined by said position decision means.

6. An apparatus for detecting the position of an object with an ultrasonic wave as defined in claim 4 or 5 wherein the plurality of kinds of ultrasonic wave pulses are two, one for covering a short distance range and the other for covering a long distance range to the object.

7. An apparatus for detecting the position of an object with an ultrasonic wave comprising:

timing control means for geneating a plurality of kinds of timing signals corresponding to a plurality of distance ranges to the object, the time intervals of the plurality of kinds of timing signals being respectively set in accordance with the corresponding plurality of distance ranges to the object;

ultrasonic wave pulse generator means for generating a plurality of different kinds of ultrasonic wave pulses in synchronism with the plurality of different kinds of timing signals from said timig control means, the widths of said plurality of kinds of ultrasonic wave pulses also being set in accordance with the corresponding plurality of distance ranges;

ultrasonic wave pulse transmitter means for transmitting alternately the pulses of the plurality of kinds of ultrasonic wave pulses from said ultrasonic wave pulse generator means;

receiver means for receiving a plurality of kinds of ultrasonic wave pulses reflected from the object as a result of the pulses transmitted from said ultrasonic wave pulse transmitter means;

received signals discriminator mean for discriminating the received plurality of kinds of ultrasonic wave pulses from said receiver means; and position decision means for determining the position of the object in accordance with signals from said received signal discriminator means.

* * * * *